E. B. SYMONS.
BEARING.
APPLICATION FILED NOV. 2, 1914.

1,163,045.

Patented Dec. 7, 1915.

Witnesses:

Inventor:
Edgar B. Symons
by Parker & Carter
his attys.

UNITED STATES PATENT OFFICE.

EDGAR B. SYMONS, OF CHICAGO, ILLINOIS.

BEARING.

1,163,045.  Specification of Letters Patent. Patented Dec. 7, 1915.

Application filed November 2, 1914. Serial No. 869,821.

*To all whom it may concern:*

Be it known that I, EDGAR B. SYMONS, a citizen of the United States, residing at Chicago, in the county of Cook and State of Illinois, have invented a certain new and useful Improvement in Bearings, of which the following is a specification.

My invention relates to packing particularly for bearings that are adapted for general use.

It is illustrated somewhat diagrammatically in a particular form of application in the accompanying drawing wherein—

Figure 1:
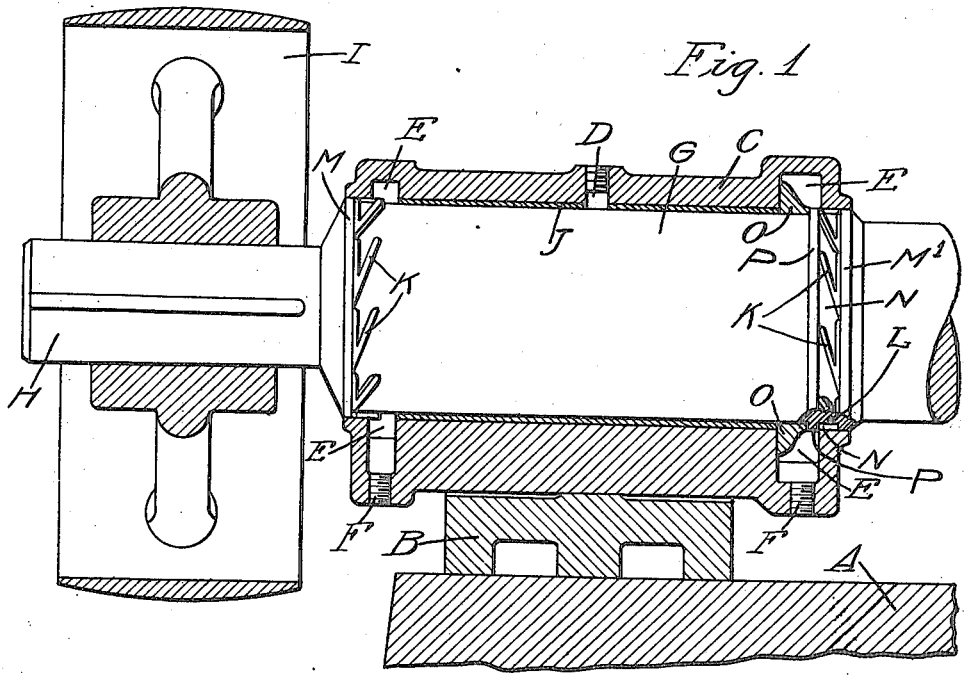
Figure 2:
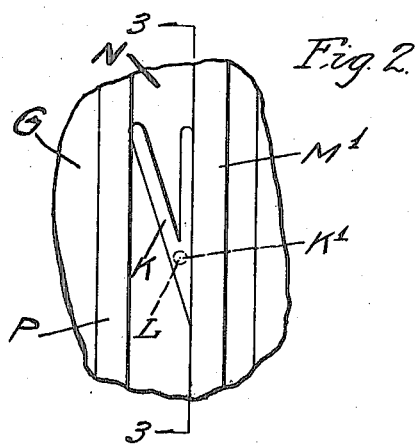
Figure 3:
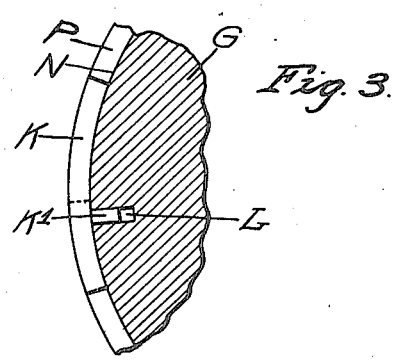

Figure 1 is a longitudinal section, Fig. 2 an enlarged detail elevation, and Fig. 3 a detailed cross-section on the line 3³ of Fig. 2.

Like parts are indicated by the same letter in all the figures.

The object of my invention is to prevent the escape of oil from a bearing or from about a shaft or from between parts one of which is rotating. This I accomplish by means of a series of outwardly movable V-shaped wipers.

A is a base, B a stool thereon, and C a cylindrical bearing mounted on the stool and provided with the oil inlet passage D, annular oil channels E, E, and oil outlets F, F, whereby oil which is forced through the passage D can escape from the outlets F, F, and be thence led to any desired place, or by means of pipes and a pump be conveyed for circulation to the inlet D.

G is a shaft which passes through the cylinder, and in this case it is shown reduced at H, and carrying the wheel I.

J is a soft metal bearing within the cylinder and about the shaft.

K, K, are wipers preferably shaped as shown in the form of a V, or with the outline of a plow share. Each is provided with an inwardly projecting pin K¹, which is adapted to be received into the hole L in the shaft.

M is a ring at one end of the bearing formed on the shaft or about it, and intended to close the aperture in that end of the cylinder while permitting the rotation of the shaft and ring.

M¹ is a somewhat similar ring developed on the shaft, and provided with a slot N, in which the V-shaped wipers rest, and a series of holes L to receive the pins K¹ on the backs of such wipers.

O is a thrust ring on the shaft within the oil channel E and P is an inward projection on the shaft G.

I do not wish to be limited to the particular size, form, shape or arrangement of the several parts, as they may be greatly varied without departing from the spirit of my invention, and moreover different features or elements can be added or substituted as occasion or the uses to which the invention is applied may require.

The use and operation of my invention are as follows:—Assuming that the parts are made substantially as shown, and that the invention is to be applied to an ordinary bearing, the oil may be carried in a continuous circulatory stream through the bearing by means of the opening and suitable connecting pipes and a pump. When the shaft has acquired a considerable speed of rotation, the tendency of the oil passing longitudinally along the shaft will be to move it radially on account of centrifugal force. At the same moment, the several V-shaped wipers will in like manner tend to pass out radially, and each will bear upon the surface of the cylinder to which it is opposed. Of course, the motion is not usually very considerable, but it is sufficient, due to centrifugal force, to hold the wipers somewhat firmly against the surface of the cylinder and here to act as plows to force the oil which is also held outwardly by centrifugal force, but which would otherwise have a tendency to escape from the end of the bearing back into the bearing, or into the annular oil passages E. These wipers, therefore, act first by means of centrifugal force to bear firmly against the inner surface of the ends of the bearing, so as to prevent the escape of the oil, and by their shape on the particular form of the invention here illustrated, they act as plows to force the oil back into the circulatory channels.

I claim:

1. The combination with a cylindrical bearing of a rotatable member mounted therein, a radially movable packing carried by and adapted to rotate with said member and interposed between it and the bearing.

2. The combination with a cylindrical bearing of a rotatable member mounted therein, a radially movable packing carried by and adapted to rotate with said member and interposed between it and the bearing, said packing comprising a series of members each separate from the others and each separately attached to the rotatable member.

3. The combination with a cylindrical bearing of a rotatable member mounted therein, a radially movable packing carried by and adapted to rotate with said member and interposed between it and the bearing, said packing comprising a series of members each separate from the others and each separately attached to the rotatable member, said separate means being grouped annularly about the rotatable member and adapted to abut closely one on the other to form a substantially annular packing ring.

4. The combination with a cylindrical bearing of a rotatable member mounted therein, a V-shaped packing member carried by and adapted to rotate with said rotatable member and interposed between it and the bearing.

5. The combination with a cylindrical bearing of a rotatable member mounted therein, a packing ring made up of a series of V-shaped packing members each separate from the others and each separately attached to and adapted to rotate with the rotatable member and each interposed between it and the bearing.

6. The combination with a cylindrical bearing of a rotatable member mounted therein, a series of separate V-shaped packing members each separately attached to the rotating member and arranged to abut one against the other and to form a substantially continuous packing ring interposed between the rotating member and the bearing.

7. The combination with a cylindrical bearing of a rotatable member mounted therein, a radially movable packing carried by and adapted to rotate with said member and interposed between it and the bearing, said packing member having a plow-like substantially radial surface inclined to a plane perpendicular to the axis of rotation.

8. The combination with a cylindrical bearing of a rotatable member mounted therein, a radially movable packing carried by and adapted to rotate with said member and interposed between it and the bearing, said packing comprising a series of members each separate from the others and each separately attached to the rotatable member, each of said packing members having a plow-like substantially radial surface inclined to a plane perpendicular to the axis of rotation.

9. The combination with a cylindrical bearing of a rotatable member mounted therein, a radially movable packing carried by and adapted to rotate with said member and interposed between it and the bearing, said packing comprising a series of members each separate from the others and each separately attached to the rotatable member, said separate means being grouped annularly about the rotatable member and adapted to abut closely one or the other to form a substantially annular packing ring, each of said packing members having a plow-like substantially radial surface inclined to a plane perpendicular to the axis of rotation.

10. A packing for shafting and the like comprising a series of plow-like wiper members each separately attached to the shaft for rotation with it and each free to move radially outwardly from the shaft, a bearing in which the shaft is mounted and an annular ring carried thereby surrounding said wipers and adapted to be frictionally engaged by them as they are thrust outwardly by centrifugal force.

11. In a bearing the combination of a rotating part with an inclosing oil containing part and packing wipers mounted on the rotating part adapted to engage the inner surface of the inclosing part and provided with an incline face to force the oil inwardly along the parts.

12. In a bearing the combination of a rotating part with an inclosing oil containing part and packing wipers mounted on the rotating part adapted to engage the inner surface of the inclosing part and provided with an incline face to force the oil inwardly along the parts, and means for preventing the longitudinal movement of the wipers along the rotating part.

13. In a bearing the combination of a rotating part with an inclosing oil containing part and packing wipers mounted on the rotating part adapted to engage the inner surface of the inclosing part and provided with an incline face to force the oil inwardly along the parts, said wipers free to move outwardly responsive to centrifugal force.

14. In a bearing the combination of a rotating part with an inclosing oil containing part and packing wipers mounted on the rotating part adapted to engage the inner surface of the inclosing part and provided with an incline face to force the oil inwardly along the parts, and an abutment at right angles to the rotating part against which the packing bears.

In testimony whereof, I affix my signature in the presence of two witnesses this 30th day of October 1914.

EDGAR B. SYMONS.

Witnesses:
MINNIE M. LINDENAU,
BESSIE S. RICE.